United States Patent [19]

Okai

[11] 4,443,024
[45] Apr. 17, 1984

[54] BICYCLE STAND UNIT

[76] Inventor: Tamao Okai, 143, Nabura, Ka'aicho, Kitakatsuragigun, Nara, Japan

[21] Appl. No.: 342,199

[22] Filed: Jan. 25, 1982

[51] Int. Cl.³ .............................................. B62H 1/06
[52] U.S. Cl. ................................................... 280/304
[58] Field of Search ............... 280/293, 297, 298, 299, 280/300, 301, 302, 303, 304; 248/352

[56] References Cited

U.S. PATENT DOCUMENTS

| 1,177,290 | 3/1916 | Tollstam | 280/293 |
| 1,382,330 | 6/1921 | Swenson | 280/304 |

FOREIGN PATENT DOCUMENTS 183362 10/1936 Switzerland .................. 280/293

Primary Examiner—John A. Pekar
Assistant Examiner—D. Lynn Fugate
Attorney, Agent, or Firm—Eyre, Mann, Lucas & Just

[57] ABSTRACT

A bicycle stand unit comprises a pair of attachments made of a metal plate provided at the hub of the rear tire, a pair of legs mounted on the attachments, each of the legs being slidable up and down along the attachment, a pair of toggle joints each of which is pivotally connected at its lower end to the leg, a pair of heavy duty-springs each of which is provided between a lower end of the toggle joint and an upper section of the attachment, the heavy-duty spring being adapted to urge the leg upwards, a pair of swingeable arms each of which is connected to an opposite end of the toggle joint by means of a rod whereby the movement of the arm is transmitted to the toggle joint, the pair of swingeable arms being carried on a rotary shaft, a foot lever rigidly connected to the rotary shaft, the foot lever being operable by foot, the rotary shaft being rotatively supported on a pair of brackets affixed to the down tube of the bicycle, the foot lever having a stop pin adapted to engage in a notch produced in a rocker pivotally affixed to one of the brackets, a lockpin inserted through the bracket, the lockpin being adapted to lock the rocker to prevent its rocking movement.

1 Claim, 9 Drawing Figures

BICYCLE STAND UNIT

BACKGROUND OF THE INVENTION

The present invention relates to a bicycle stand unit adapted for attachment to the rear tire of a bicycle, and more particularly, to a bicycle stand unit including a pair of legs capable of sliding up and down under the action of heavy-duty springs, thereby allowing the rear tire to land on or keep off the ground. The operation manually is made by the cyclist riding on the bicycle.

Modern bicycles are provided with stand units at their rear tires, whereby the bicycles rest thereon when not in use. There are two types of stand units; one includes a pair of erectable legs, and the other includes a single leg against which the bicycle is leaned. In any case the cyclist is required to get off the bicycle to operate the stand unit. This is inconvenient; particularly when a heavy lugguage is mounted on the carrier, it is in danger of slipping off when the legs are erected. When the leg is single, the bicycle unavoidably takes a leaning posture against the leg. The luggage on the carrier is more likely to slip off.

OBJECTS AND SUMMARY OF THE INVENTION

The present invention aims at solving the problems pointed out above with respect to the conventional stand units, and has for its object to provide an improved bicycle stand unit readily handled by the cyclist without getting off the bicycle.

Other objects and advantages of the present invention will become more apparent from the following description when taken in connection with the accompanying drawings which show, for the purpose of ilustration only, one embodiment in accordance with the present invention.

According to the present invention, a bicycle stand unit comprises a pair of attachments made of a metal plate provided at the hub of the rear tire, a pair of legs mounted on the attachments, each of the legs being slidable up and down along the attachment, a pair of toggle joints each of which is pivotally connected at its lower end to the leg, a pair of heavy duty-springs each of which is provided between a lower end of the toggle joint and an upper section of the attachment, the heavy-duty spring being adapted to urge the leg upwards, a pair of swingable arms each of which is connected to an opposite end of the toggle joint by means of a rod whereby the movement of the arm is transmitted to the toggle joint, the pair of swingable arms being carried on a rotary shaft, a foot lever rigidly connected to the rotary shaft, the foot lever being operable by foot, the rotary shaft being rotatively supported on a pair of brackets affixed to the down tube of the bicycle, the foot lever having a stop pin adapted to engage in a notch produced in a rocker pivotally affixed to one of the brackets, a lockpin inserted through the bracket, the lockpin being adapted to lock the rocker to prevent its rocking movement.

DETAILED DESCRIPTION OF THE INVENTION

Figure 1:
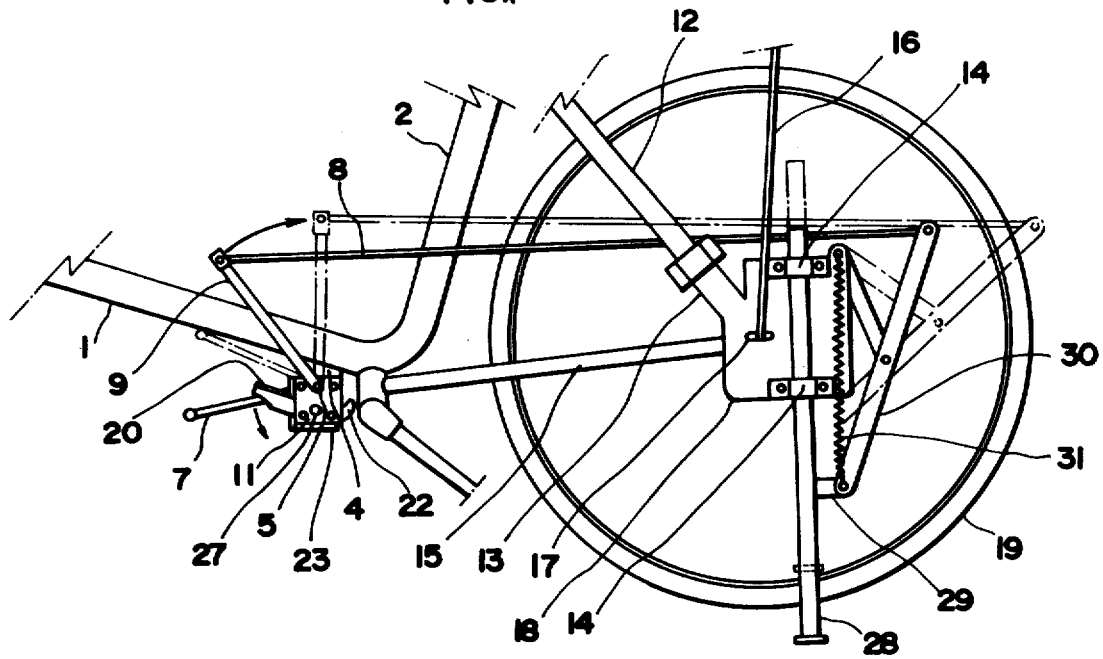
FIG. 1 is a front view showing a bicycle stand unit according to the present invention.
Figure 2:
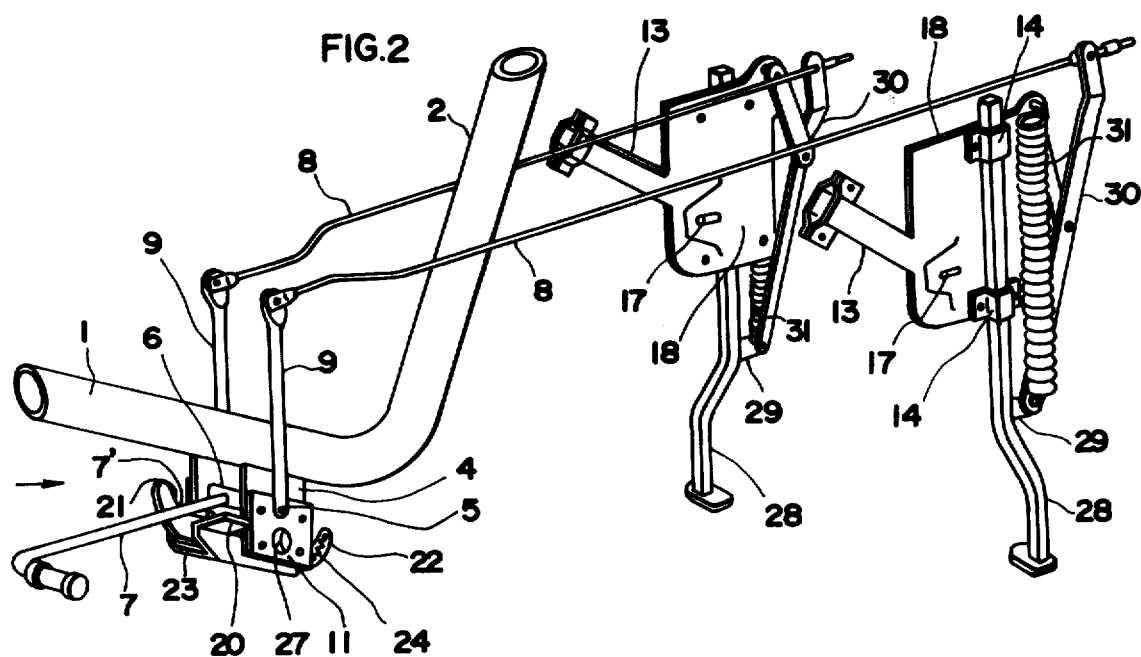
FIG. 2 is a perspective view on an enlarged scale of the bicycle stand unit.
Figure 3:
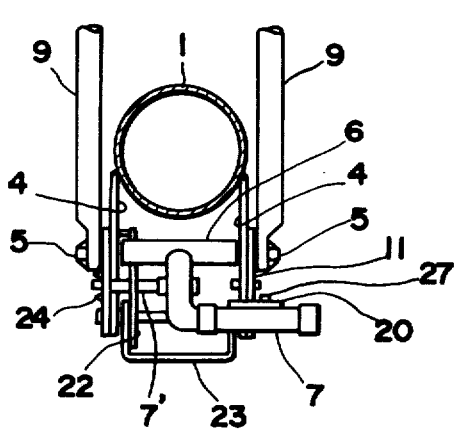
FIG. 3 is a front view showing an arrangement of the down tube, the brackets, the swingable arms and the foot lever.
Figure 4:
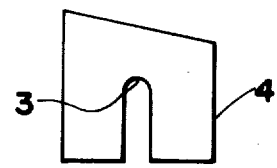
FIG. 4 is a front view of the bracket.
Figure 5:
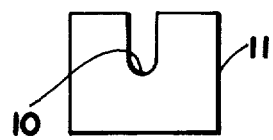
FIG. 5 is a front view of an auxiliary plate.

Referring to FIGS. 1 to 3, a pair of brackets 4 are affixed as by welding to opposite sides of a down tube 1, wherein the reference numeral 2 designates a seat tube. Each bracket has a slot 3 in which a rotary shaft 6 is received, to which rotary shaft 6 a foot lever 7 is integrally connected. The foot lever 7 includes a stop pin 7'. A pair of arms 9 are rigidly connected to the rotary shaft 6 at 5. The reference numeral 11 designates auxiliary plates which are affixed to the brackets 4. Each auxiliary plate 11 has a slot 10 formed correspondingly to the slot 3 of the bracket 4.

A pair of rods 8 are respectively pivotally connected to the arms 9, the rods 8 being connected to the toggle joints 30 so as to transmit the movement of the arms 9 thereto.

At the rear tire 19 an attachment 18 having a sleeve 13 is provided. The attachment 18 has a hole 17 lengthwisely formed in which a hub shaft of the rear tire 19 is received. The sleeves 13 are adapted to receive seat stays 12. Legs 28 are mounted on the attachments 18 by being inserted through support members 14 such that the legs can slide up and down. Each leg 28 has a bracket 29 at which the toggle joint 30 is pivotally connected. The toggle joint 30 is pivotally connected to the rod 8 at its opposite end. A heavy-duty spring 31 is connected at its one end to the lower end of the toggle joint 30 at which the toggle joint is pivotally connected to the bracket 29, and at the other end to an upper section of the attachment 18 such that the leg 28 is normally raised under the action of the heavy-duty spring 31. By virtue of the lengthwise configuration of the hole 17, the position of the attachment 18 can be decided as desired with respect to the hub shaft. The reference numerals 15 and 16 designate a chain stay and a carrier stay, respectively, which are connected to the hub shaft.

Figure 6:
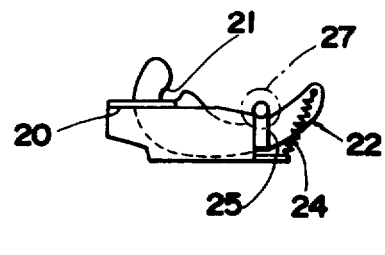
FIG. 6 is a front view of the rocker.
Figure 7:
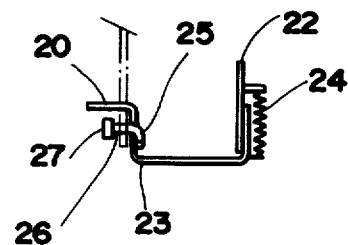
FIG. 7 is a rear view showing an arrangement of the rocker and the lockpin.

Referring to FIG. 6 a rocker 22 is provided with a notch 21 adapted to receive the stop pin 7' of the foot lever 7 whereby the foot lever is locked not to move. The rocker 22 is affixed to one inside wall of a steel channel member 23 as shown in FIG. 3, and they are pivotally affixed to the brackets 4, wherein a spring 24 is connected between a tail portion of the rocker 22 and the auxiliary plate 11 such that the rocker 22 is normally urged in the clockwise direction in FIG. 6. In this situation the stop pin 7' is engaged in the notch 21 of the rocker 22, thereby preventing the foot lever 6 from swinging in either direction. The reference numeral 20 designates a foot step formed by bending a rim portion of the steel channel member 23. By oppressing the foot step 20 by foot, the channel member 23 and accordingly the rocker 22 are rotated against the spring 24 in the anticlockwise direction in FIG. 6, thereby releasing the stop pin 7' from the notch 21 of the rocker. The locking and releasing of the rocker 22 is made by a rotary L-shaped lockpin 25 passed through the bracket 4 and the auxiliary plate 11. The lockpin 25 has a knob 27 and a crooked end, which can restrain the channel member 23 from rotating when the crooked end is caused to engage with the upright inside wall of the channel member 23. The reference numeral 26 is a spring provided between the knob 27 of the lockpin 25 and the auxiliary plate 11.

Figure 8:
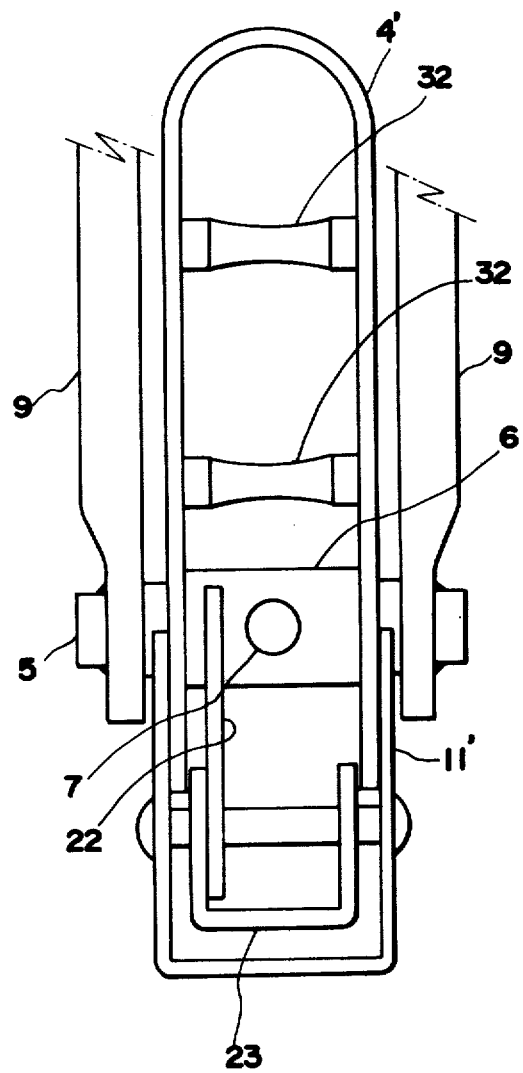
FIG. 8 is a side view showing a modified version of the embodiment.
Figure 9:
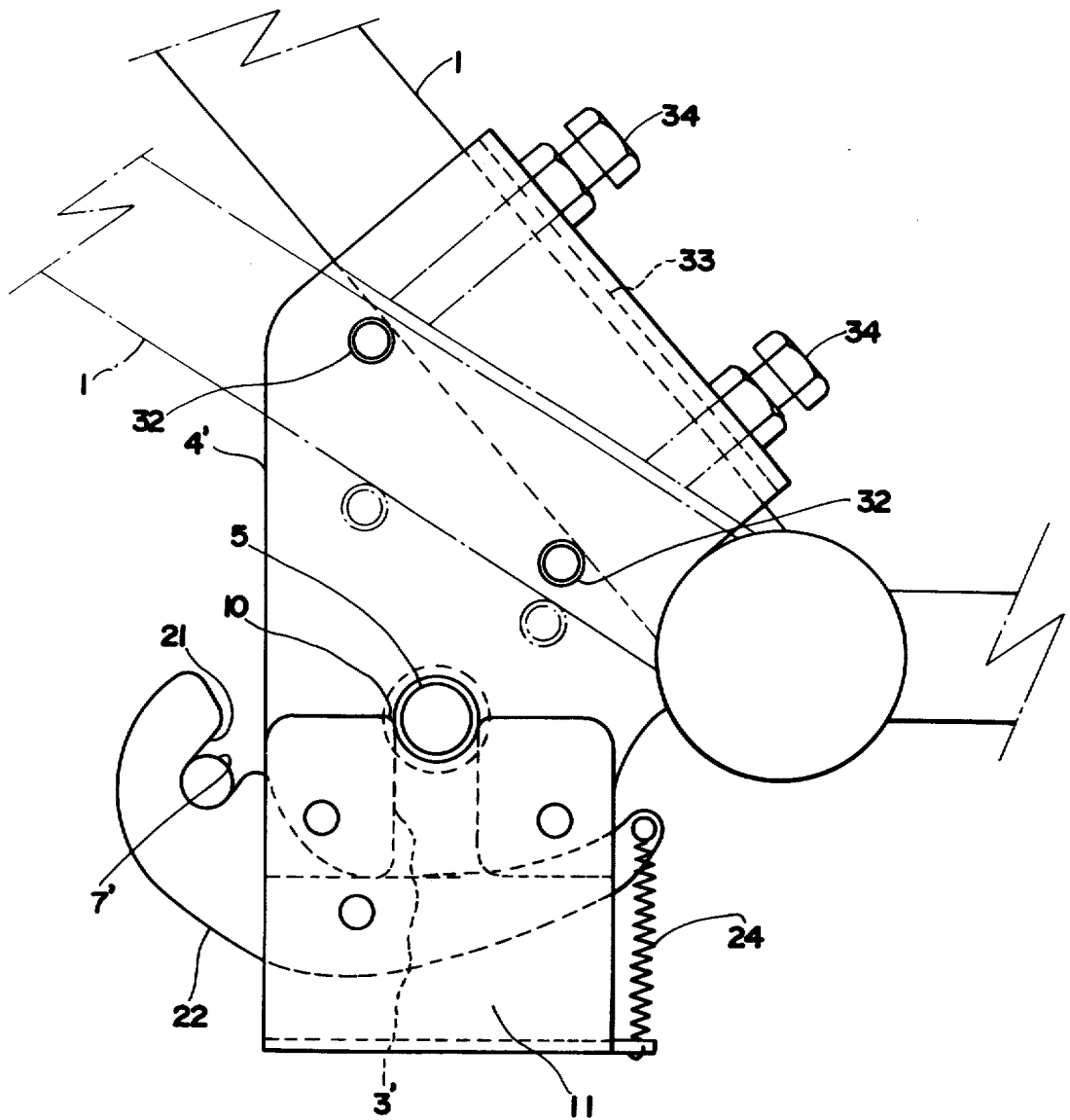
FIG. 9 is a front view of the embodiment of FIG. 8.

Referring to FIGS. 8 and 9 a modified version of the embodiment will be explained:

In this embodiment the pair of brackets 4 are replaced by a single bracket 4' having a cross-section of the reversed letter U as shown in FIG. 8. The down tube 1 is supported on bars 32 transversely provided in the bracket 4', wherein the bars have concaved cylindrical surfaces so as to allow the down tube 1 to be facedly received thereon. The down tube 1 is oppressed by tap bolts 34 against the bars 32, wherein the reference numeral 33 designates a liner 33. In this way the bracket 4' and the down tube 1 are united under the oppression provided by the tap bolts 34. The bracket 4' also has a slot 3' adapted to receive the rotary shaft 6 on which the arms 9 and the foot lever 7 are carried in the above-mentioned manner. The auxiliary plate 11' having slots 10 is equally U-shaped as shown in FIG. 8, and affixed to the outside wall of the bracket 4'. The auxiliary plate 11' also has a slot 10 to mate with the slot 3' of the bracket 4'. This modified version has an advantage that by selecting the tap bolts having different lengths the bracket 4' can be applied to any type of bicycles in which angles of the down tubes are different.

In operation, when the cyclist wants to start the bicycle, he, while riding thereon, rotates the knob 27 to release the channel member 23 (that is, the rocker 22) from the lockpin 25, and at the same time oppresses the foot step 20 to disengage the stop pin 7' of the foot lever 7 from the notch 21 of the rocker 22. In this way the foot lever 7, the arms 9, the rods 8 and the toggle joints 30 are made free, thereby enabling the heavy-duty springs 31 to overcome the restraint provided by the toggle joints. Thus the legs 28 are raised under the action of the heavy-duty springs 31, thereby allowing the rear tire to land on the ground. The bicycle is ready to start.

When the cyclist wants to get off the bicycle, he oppresses the foot lever 7 by foot, thereby causing the legs 28 to descend against the heavy-duty springs 31 until the rear tire 19 keeps off the ground. At this stage, even when a lugguage is placed on the carrier, the cyclist can get off with no fear about a possible falling-off of the lugguage. In this situation, the foot lever 7 is locked with its stop pin 7' engaging in the notch 21 of the rocker 22. The bicycle can firmly rest on the descended legs, so that the bicycle is kept safe from falling down even if any force accidentally exerts on the foot lever 7. In addition, the bicycle is protected against stealing.

What is claimed is:

1. A bicycle stand unit for a bicycle having a rear tire with a hub comprising a pair of attachments made of a metal plate provided at the hub of the rear tire, a leg mounted on each said attachment, each of said legs being slidable up and down along said attachment, a pair of toggle joints each of which is pivotally connected at its lower end to one said leg, a pair of heavy duty-springs each of which is provided between a lower end of said toggle joint and an upper section of said attachment, said heavy-duty spring being adapted to urge said leg upwards, a pair of swingable arms each of which is connected to an opposite end of one said toggle joint by means of a rod whereby the movement of said arm is transmitted to said toggle joint, said pair of swingable arms being carried on a rotary shaft, a foot lever rigidly connected to said rotary shaft, said foot lever being operable by foot, said rotary shaft being rotatively supported on a pair of brackets affixed to the down tube of the bicycle, said foot lever having a stop pin adapted to engage in a notch produced in a rocker pivotally affixed to one of said brackets, a lockpin inserted through said bracket, said lockpin being adapted to lock said rocker to prevent its rocking movement.

* * * * *